A. A. BARRON.
INSECT DESTROYER.
APPLICATION FILED OCT. 1, 1913.
1,106,615.
Patented Aug. 11, 1914.
2 SHEETS—SHEET 1.
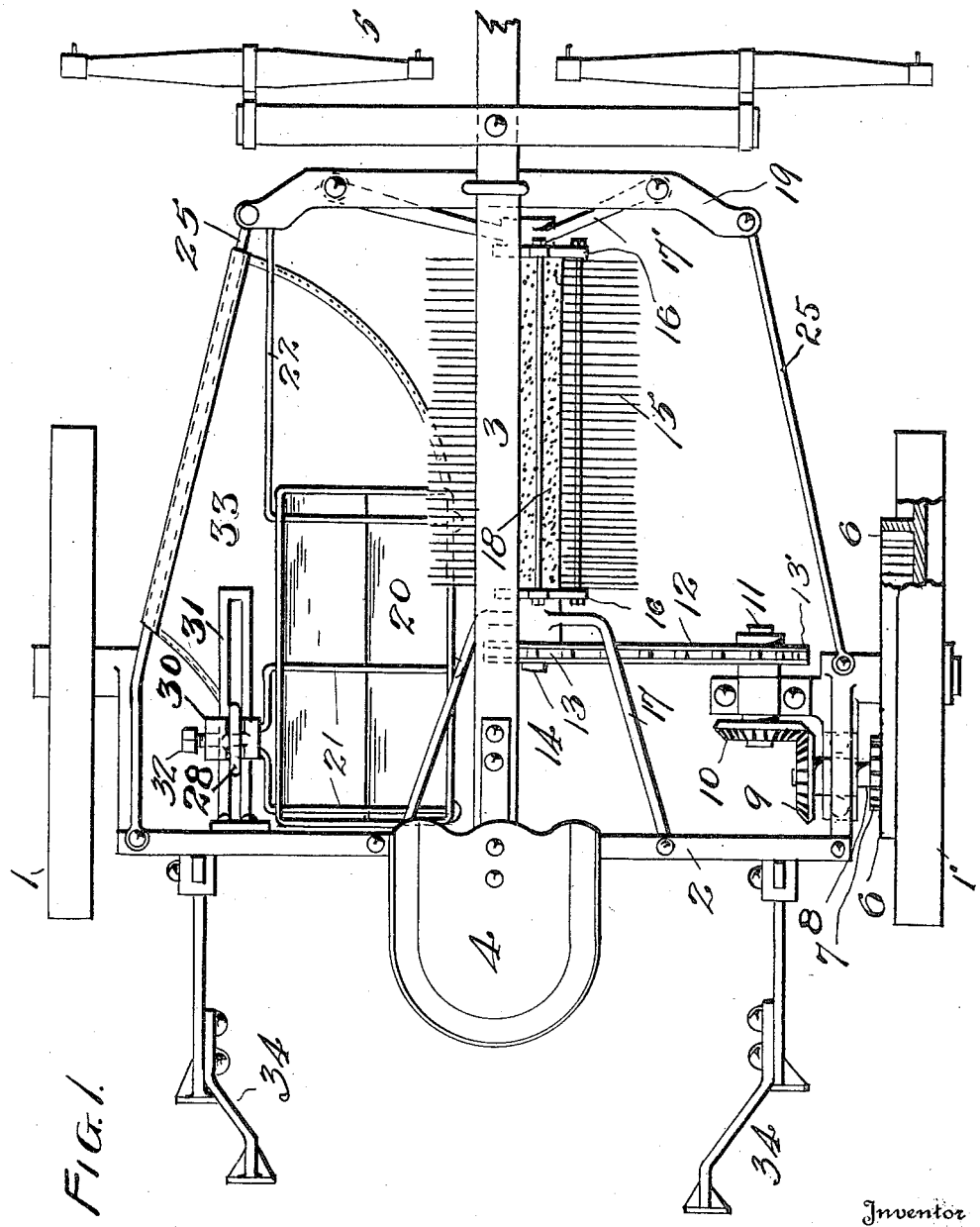
FIG. 1.
Witnesses
C. K. Davis
George Buckler
Inventor
Abner A. Barron
by
Attorney A. A. BARRON.
INSECT DESTROYER.
APPLICATION FILED OCT. 1, 1913.
1,106,615.
Patented Aug. 11, 1914.
2 SHEETS—SHEET 2.
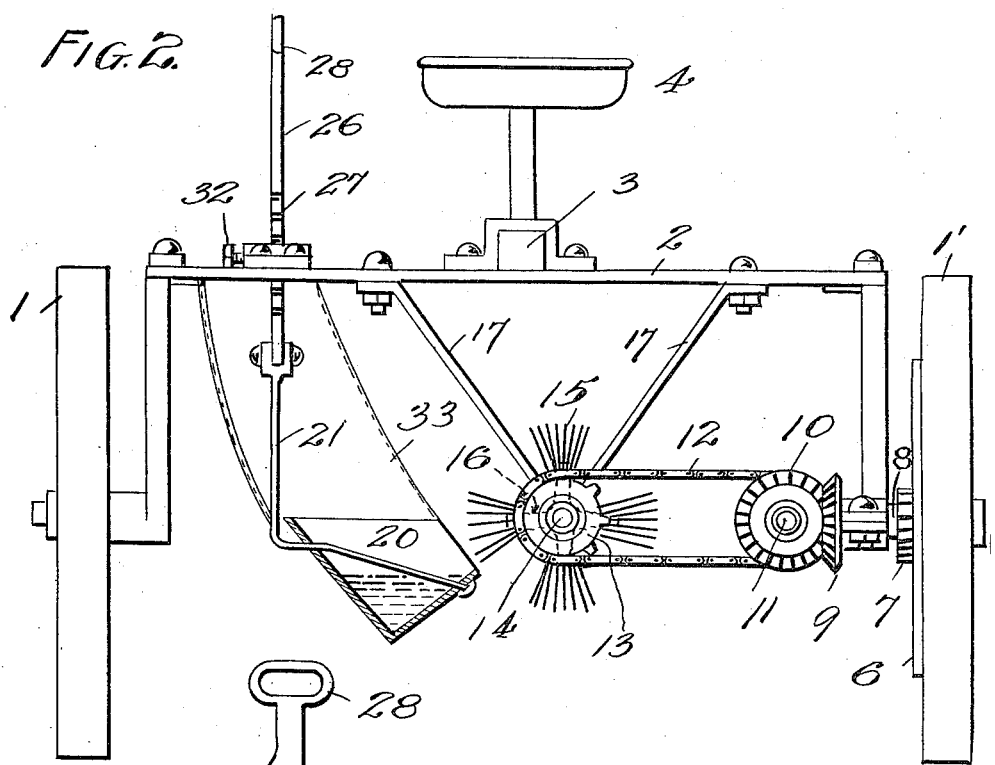
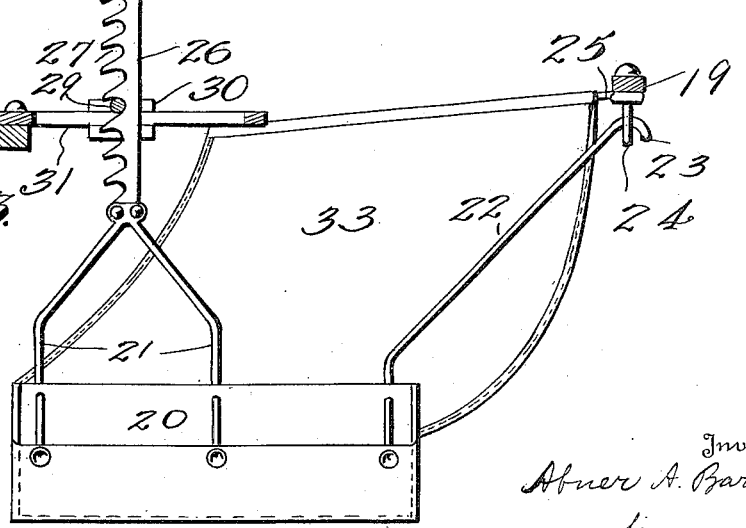
Witnesses
C. K. Davis
George Buckles
Inventor
Abner A. Barron
by
J. H. Adriaans
Attorney

UNITED STATES PATENT OFFICE.

ABNER A. BARRON, OF DUCK HILL, MISSISSIPPI.

INSECT-DESTROYER.

1,106,615.  Specification of Letters Patent.  Patented Aug. 11, 1914.

Application filed October 1, 1913.  Serial No. 792,713.

*To all whom it may concern:*

Be it known that I, ABNER A. BARRON, of Duck Hill, in the county of Montgomery and State of Mississippi, have invented certain new and useful Improvements in Insect-Destroyers; and I do hereby declare that the following is a full, clear, and exact description thereof, reference being had to the accompanying drawings, and to the letters of reference marked thereon, which form part of this specification.

My invention relates to insect destroyers; and the objects thereof are first, to effect this result with certitude; second, to accomplish it with structural simplicity; third, to prevent survival of insects removed from vegetation thereby; fourth, to provide for the operation of the device by the progressive motion of cultivator plows; fifth, to attain these ends with mechanical economy. I secure these objects by the mechanism illustrated in the accompanying drawing, in which:—

Figure 1 is a top plan view of the mechanism embodying my invention, attached to a cultivator plow, Fig. 2 is a rear elevation thereof, with the plows omitted, Fig. 3 is a detail view of the mechanism by which the boll weevil, and affected squares, are removed into an oil tank for destruction.

The same designations indicate corresponding parts throughout the several views:—

An axle 2 mounted on wheels 1, 1' supports centrally a seat 4 attached to the draft pole 3, riveted or screwed thereto. The wheel 1' has concentrically secured to its inner side a gear wheel 6 meshing with teeth 7 on the shaft 8. The revolution of this shaft actuates the pinion 9 meshing with wheel 10, mounted on shaft 11 whereto the sprocket wheel 13' is also secured. The rotation of the latter is transmitted to the sprocket wheel 13 by chain 12 thus revolving the shaft 14 whereon the rotary frame 18 is mounted, having arms 16 wherefrom brushes 15 radially project. The frame 18 is supported by rods 17 from the axle 2 and by rods 17' from a yoke 19 which is secured to the under surface of the pole 3, and is connected by braces 25 to the axle 2. Suspended from one of the braces 25 is the apron 33, which terminates downwardly in the oil tank 20, that receives by gravity weevils and diseased squares that are removed from the cotton by the brush 15 to the apron 33. The tank 20 is capable of vertical alteration by the lever 26, whose teeth 27 engage a transverse rod 29, attached to the yoked arm 31, whereto it is adjustably secured by nut 30 and screw 32. The tank 20 is connected to the yoke 19 by rod 22 whose bent end 23 is held in the loop 24, passed through the yoke by its straight end. The tank is attached also to the lever 26 by angle rods 21. The handle 28 of the lever 26 serves to raise the same vertically or to adjust the same laterally to assume any desired angle to receive the weevils, etc. from the brush 15. Plows 34 are also suspended from the axle 2. The entire mechanism is operated by equine, or other, power by draft gear 5.

Having thus fully described my invention, what I claim is:

In an insect destroyer, the combination of a main frame, provided with wheels; a rotary beater supported from said frame; gearing connecting one of the wheels with the beater for rotating the same; an apron hung from the side of the frame beside the beater; and a liquid containing tank supported by the frame to the rear of the beater for receiving insects brushed by the beater to the apron, said tank being vertically and laterally adjustable with respect to the frame; for the purposes herein shown and described.

In testimony that I claim the foregoing as my own I affix my signature in presence of two witnesses.

ABNER A. BARRON.

R. C. Fox,
W. S. ESKRIDGE.

Copies of this patent may be obtained for five cents each, by addressing the "Commissioner of Patents, Washington, D. C."